(12) United States Patent
Santos Poli et al.

(10) Patent No.: US 11,940,352 B2
(45) Date of Patent: Mar. 26, 2024

(54) SYSTEM AND METHOD FOR DETECTING WATERTIGHTNESS IN THE ANNULAR SPACE OF FLEXIBLE LINES

(71) Applicant: PETRÓLEO BRASILEIRO S.A.—PETROBRAS, Rio de Janeiro (BR)

(72) Inventors: Paulo Roberto Santos Poli, Rio de Janeiro (BR); Joao Marcio De Castilho Santos, Rio de Janeiro (BR); Gustavo Pinto Pires, Rio de Janeiro (BR); Cassio Kuchpil, Rio de Janeiro (BR); Carlos Eduardo Maia De Souza, Rio de Janeiro (BR)

(73) Assignee: Petróleo Brasileiro S.A.—Petrobras, Rio de Janeiro (BR)

(*) Notice: Subject to any disclaimer, the term of this patent is extended or adjusted under 35 U.S.C. 154(b) by 398 days.

(21) Appl. No.: 17/298,482

(22) PCT Filed: Dec. 2, 2019

(86) PCT No.: PCT/BR2019/050513
§ 371 (c)(1),
(2) Date: May 28, 2021

(87) PCT Pub. No.: WO2020/113296
PCT Pub. Date: Jun. 11, 2020

(65) Prior Publication Data
US 2022/0034747 A1    Feb. 3, 2022

(30) Foreign Application Priority Data
Dec. 3, 2018  (BR) .................. 1020180750291

(51) Int. Cl.
*G01M 3/28* (2006.01)
*E21B 47/06* (2012.01)
*E21B 47/117* (2012.01)

(52) U.S. Cl.
CPC ........... *G01M 3/2815* (2013.01); *E21B 47/06* (2013.01); *E21B 47/117* (2020.05)

(58) Field of Classification Search
CPC ..... G01M 3/2815; E21B 47/117; E21B 47/06
(Continued)

(56) References Cited

U.S. PATENT DOCUMENTS 6,171,025 B1   1/2001 Langner et al.
7,942,452 B2 * 5/2011 Carns .................. G01M 3/283
                                              285/123.1

(Continued)

FOREIGN PATENT DOCUMENTS

BR    PI0907411 A2   7/2015
WO    2009094630 A1  7/2009

*Primary Examiner* — Tran M. Tran
(74) *Attorney, Agent, or Firm* — Mintz, Levin, Cohn, Ferris, Glovsky and Popeo, P.C.

(57) ABSTRACT

A system for detecting the watertightness or flooding of an annulus of flexible lines from a connector. The system includes: an assembly of plunger and cylinder that are connected by a rod to a chamber that acts as a pilot valve. The assembly is connected directly to the outlet of a safety valve of a connector of the flexible line, in which same are fitted using a sealing system. The system is operated by commands sent to a ROV that has an arm and that controls the system using a handle.

11 Claims, 3 Drawing Sheets

(58) Field of Classification Search
USPC .................................................... 73/40.5 R
See application file for complete search history.

(56) References Cited

U.S. PATENT DOCUMENTS

| | | | | |
|---|---|---|---|---|
| 8,210,029 | B2* | 7/2012 | Hart | G01M 3/022 |
| | | | | 73/866.5 |
| 8,887,768 | B2* | 11/2014 | Hart | G01M 3/04 |
| | | | | 138/91 |
| 9,400,227 | B2 | 7/2016 | Ramos et al. | |
| 9,982,823 | B1* | 5/2018 | Cornwall | F16L 21/08 |
| 10,935,455 | B2* | 3/2021 | Banerjee | G01M 3/007 |
| 11,719,716 | B1* | 8/2023 | Toutov | G01B 7/023 |
| | | | | 324/207.11 |
| 11,841,293 | B2* | 12/2023 | Littlestar | G01M 3/2861 |
| 2010/0059221 | A1* | 3/2010 | Vannuffelen | E21B 49/081 |
| | | | | 166/264 |
| 2022/0128512 | A1* | 4/2022 | Santos Poli | G01N 29/225 |
| 2023/0097186 | A1* | 3/2023 | Johannesson | B64U 10/70 |
| | | | | 244/108 |
| 2023/0106752 | A1* | 4/2023 | Santos Poli | E21B 34/08 |
| | | | | 166/373 |
| 2023/0260148 | A1* | 8/2023 | Saiani | G06V 10/141 |
| | | | | 382/103 |

\* cited by examiner

SYSTEM AND METHOD FOR DETECTING WATERTIGHTNESS IN THE ANNULAR SPACE OF FLEXIBLE LINES

CROSS-REFERENCE TO RELATED APPLICATIONS

This application is a U.S. national phase filing under 35 U.S.C. § 371 of International Application No. PCT/BR2019/050513, filed Dec. 2, 2019 and claims priority to Brazilian Application No. BR 102018075029-1, filed Dec. 3, 2018. The entire contents of the prior applications are incorporated herein by reference in their entity.

SCOPE OF THE INVENTION

The present invention relates to production and undersea equipment technology. More specifically, the present invention relates to systems for detecting watertightness to prevent water invasion and flooding in the annular space of flexible lines used in the oil and gas industry.

BACKGROUND TO THE INVENTION

Most of the offshore oil production in Brazil flows through flexible lines. The reserves in the pre-salt scenario contain a large quantity of CO□ in the oil flows that, along with other gas components, permeate through the polymer sealing layer as far as the carbon-steel layers in the annular space of the flexible line. These wires are isolated from the outside environment by a polymer layer, known as the external layer.

Determining the actual state of the annulus of a flexible line is a challenge in the oil industry, in particular in the undersea production system projects in the pre-salt layer of the Santos Basin, which use production systems with different types of undersea lines, including rigid lines, hybrid lines (comprising combinations of rigid and flexible lines) and mainly flexible lines, which make up more than 90% of the total lines.

A lack of watertightness of the external layer of a flexible line causes the ingress or invasion of water into the annular space. This creates the conditions enabling the stress-corrosion mechanism caused by the presence of CO□, causing not just corrosion but also cracking with the possibility of breakage of these metal wires in the traction layers, with the consequent loss of the containment of these lines.

Since flooding of the annulus is only observed in a small fraction of lines, and this phenomenon significantly reduces calculated service life, potentially resulting in unexpected catastrophic failures.

It is essential to identify which lines are flooded so as to prevent the unnecessary collection (removal) of lines in which the annulus is dry, and to avoid interruptions to operation of the network of lines in an operating unit.

The invention relates to a device (equipment) and a method for measuring the pressure value inside the annulus of a flexible line in operation, to directly determine whether this annulus is watertight or otherwise. The invention makes it possible to directly check watertightness of the annulus of the line by measuring the pressure in the annulus using a safety valve in the connectors on the lines in operation. Reading the pressure in the connectors at the two ends of each section makes it possible to distinguish between flooded and dry states.

The invention uses a non-destructive testing technique given that said technique has to overcome the technical difficulties caused by the physical multi-layer composition of the flexible lines, primarily as a result of comprising different materials.

The invention makes it possible to collect fluid or gas samples from inside the annulus for subsequent analysis, which helps to distinguish between condensate and seawater, as well as assessing the composition and corrosiveness of the annulus, in the event of fluid being detected.

The invention can be used regardless of the number of layers and in oil production lines, gas injection lines and gas-lift lines. In addition to this, the operating water depth does not affect the efficiency of this technology since, unlike tubular-body inspection technologies, this technology checks the condition of the annulus through the connector, which is not liable to be deformed or affected by hydrostatic pressure.

The technologies available on the market have usage limitations relating to the number and thickness of the layers of the line, the operating water depth, and identifying, where applicable, the source of water in the annulus. There are patent documents in the prior art (listed below) that provide solutions for the aforementioned problems, albeit using completely different techniques.

The application published as BRPI0907411 discloses a technique for monitoring and measuring the quantity of water that has invaded the annulus. The system and method analyze and determine the volumetric composition of discharge gases, as well as detecting water flooding. The invention also measures pressure and temperature and gas flow in the annulus via a discharge valve. The invention is intended to resolve problems such as measuring composition and volume, for example using gas chromatography and mass spectrometry, etc., with samples collected and transported to a laboratory. Accordingly, the present invention is intended to speed up measurement by placing analyzers on the line with a processing unit and recording using specific software for interpreting the information.

U.S. Pat. No. 9,400,227B2 discloses a system and method for detection of fluid invasion in an annular space of a pipe structure. The system includes a thermal element and a temperature sensing element placed in the vicinity of each other in the annular space of the pipe structure. A thermal signal is generated by the thermal element. The temperature sensing element is connected to a monitor that monitors and processes the thermal signal. As the thermal signal changes when conducted through different types of fluids, the invasion of an annular space by seawater that normally contains oil or gas may be reliably detected.

U.S. Pat. No. 6,171,025 discloses a method for pipeline leak detection in which a vacuum is maintained in the annulus of a pipe-in-pipe flowline with a vacuum pump having a discharge reservoir which is monitored for the appearance of water and hydrocarbon vapors. In another aspect of the invention, pipeline (undersea line) leak detection is accomplished through maintaining a gas at a nominally constant pressure in an annulus and monitoring the annulus for pressure increase indicative of water or product intrusion into the annulus.

The invention therefore relates to a system that not only identifies the presence of water in the annulus of a flexible line in operation, but also quantifies the pressure in the annulus at any depth.

As detailed below, the present invention is intended to provide a solution to the prior art problems described above in a practical and efficient manner.

SUMMARY OF THE INVENTION

The present invention is intended to provide a method and equipment (device) for measuring the pressure value inside the annulus of a flexible line in operation, to directly determine whether this annulus is watertight or otherwise.

To achieve the objectives set out above, the present invention provides a system for detecting the watertightness of a flexible line by measuring the pressure in the annulus from a connector of the flexible line including: an ROV that includes an arm element designed to move the main device until the device has engaged in the safety valve of the connector, and more specifically in the recess containing the safety valve.

The invention describes an operating method for the equipment for detecting the water tightness of the annulus of the flexible line to provide a critical analysis of the results, being therefore dependent on the initial and final pressure values indicated before and after movement of the plunger.

Furthermore, the invention may optionally contain a chamber for capturing fluid samples discharged from the annulus by causing the safety valve to open by reducing external pressure.

Furthermore, the device may optionally contain a hexagonal socket for removal of the safety valve or of the plug installed in the connector of the flexible line.

SHORT DESCRIPTION OF FIGURES

The detailed description provided below makes reference to the attached figures and the respective reference numbers therein.

DETAILED DESCRIPTION OF THE INVENTION

The descriptions below relate to a preferred embodiment and to two additional optional embodiments expanding the functionality of the main invention. However, as is obvious to any person skilled in the art, the invention is not limited to these embodiments.

Figure 1:
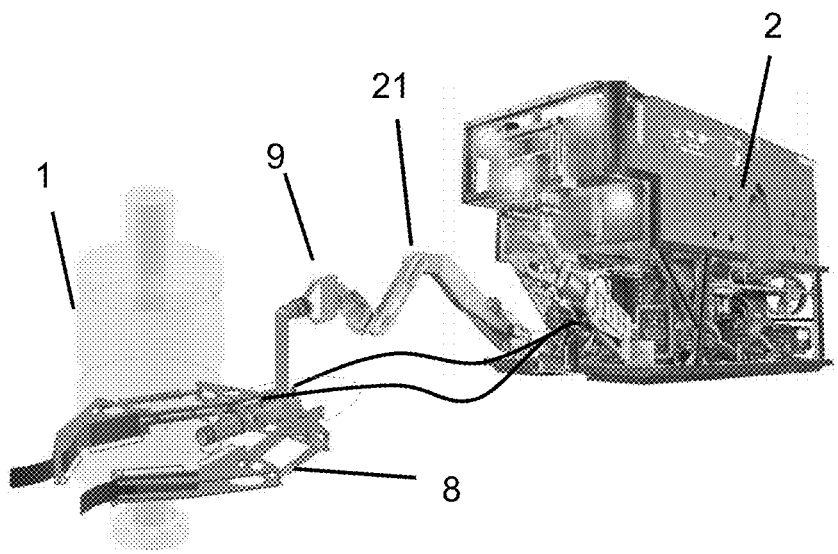
FIG. 1 is a schematic view of the system for detecting the watertightness of the annulus of a flexible line from the connector thereof, showing all of the component parts thereof according to the main configuration of the present invention.
Figure 2:
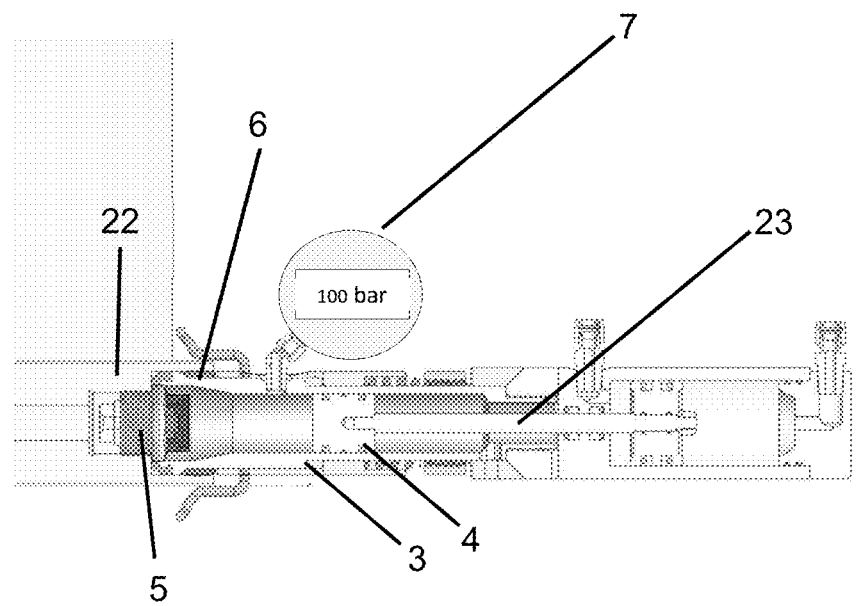
FIG. 2 shows the device that is coupled to the connector, representing the main embodiment of the invention.

FIG. 1 is a schematic view of the system for detecting the watertightness of the annulus of a flexible line from the connector thereof, showing all of the component parts thereof according to the main configuration of the present invention. FIG. 2 details the main object and the main suggested embodiment.

The invention involves a method for checking the watertightness of the annulus of undersea flexible lines by measuring the pressure of the annulus. This measurement is taken using the safety valve (5) in the connectors of the flexible lines (1).

To enable the pressure in the annulus of the flexible lines to be measured in operation, the invention uses a device controlled by a remotely operated vehicle (ROV) (2).

Said device comprises an assembly in the form of a cylinder (3) and a plunger (4) (piston-cylinder arrangement) installed in the recess also containing the safety valve (5) of the connector of the flexible line (1). The cylinder (3) has a sealing system (6) that provides a seal between the external environment and the front region of the plunger of the cylinder, where the external portion of the safety valve (5) is located. There is also a pressure gauge (7) connected to the chamber created between the cylinder (3) and the plunger (4) for measuring the pressure in the front region of the cylinder, enabling variations in the external pressure acting on the safety valve (5) to be determined as the plunger (4) is moved.

To position the assembly of cylinder (3) and plunger (4) and to activate the sealing system (6) thereof, the invention has a dog-like coupling and anchoring system (8) controlled by the ROV (2) that grasps the connector of the flexible line (1), installing the device in the recess of the safety valve (5) of the connector of the line (1) and sealing the cylinder (3) of the device against the wall of the recess of the valve (5). The invention is intended to cover any coupling system of the device and activation of the sealing system.

The device can be sealed against the wall of the recess of the valve (5), ensuring watertightness from the external environment, by energizing polymer or metal rings against the wall and the base of the recess, as well as by opening threads in the wall of the recess or another mechanical device enabling permanent or non-permanent fastening.

The device is then installed and sealed from the external environment. The method for checking the watertightness of the annulus by measuring the pressure in the annulus involves moving the plunger (4) of the device to cause a pressure drop in the outer portion of the safety valve of at least 2 bar, thereby activating this valve (the safety valves of the connectors of the flexible line are activated automatically when the difference between the pressure in the annulus and the external pressure is greater than 2 bar). The pressure gauge monitoring the pressure in the device (7) indicates the pressure at which the valve (5) opened, thereby revealing the pressure in the annulus.

The method does not necessarily require activation of the valve to determine whether the annulus of the flexible line is watertight. Following the movement of the plunger (4) to reduce the external pressure of the valve (5), even if this reduction is not enough to activate the valve, stabilization of the pressure in the pressure gauge at a pressure less than the hydrostatic pressure indicates that the annulus is at a pressure below the hydrostatic pressure, from which it can be inferred that there is no communication between the annulus and the external environment, i.e. that the annulus is watertight.

If the pressure in the pressure gauge (7) stabilizes at a pressure similar to the hydrostatic pressure, it can be inferred that the pressure in the annulus is close to the hydrostatic pressure, which can be cause by two factors:

i) Communication between the annulus and the external environment as a result of damage to the external layer of the line or failure of the sealing system thereof, resulting in a loss of watertightness of the annulus.

ii) Accumulation and pressurization of permeate gases in the production fluid up to the activation pressure of the safety valve. In this case, the pressure in the annulus is relieved by the valve installed in the connector where the external pressure is lowest, keeping the pressure thereof similar to the external pressure of the connector located in the shallowest waters. In this case, to determine whether the annulus is watertight, the pressure in the connector of the annulus installed at the greatest depth should be measured.

Accordingly, if the pressure in the annulus is found to be similar to the external pressure, the conclusion is the same as point (i), whereas if the pressure in the annulus is below the external pressure, it can be inferred that the annulus is watertight.

Figure 3:
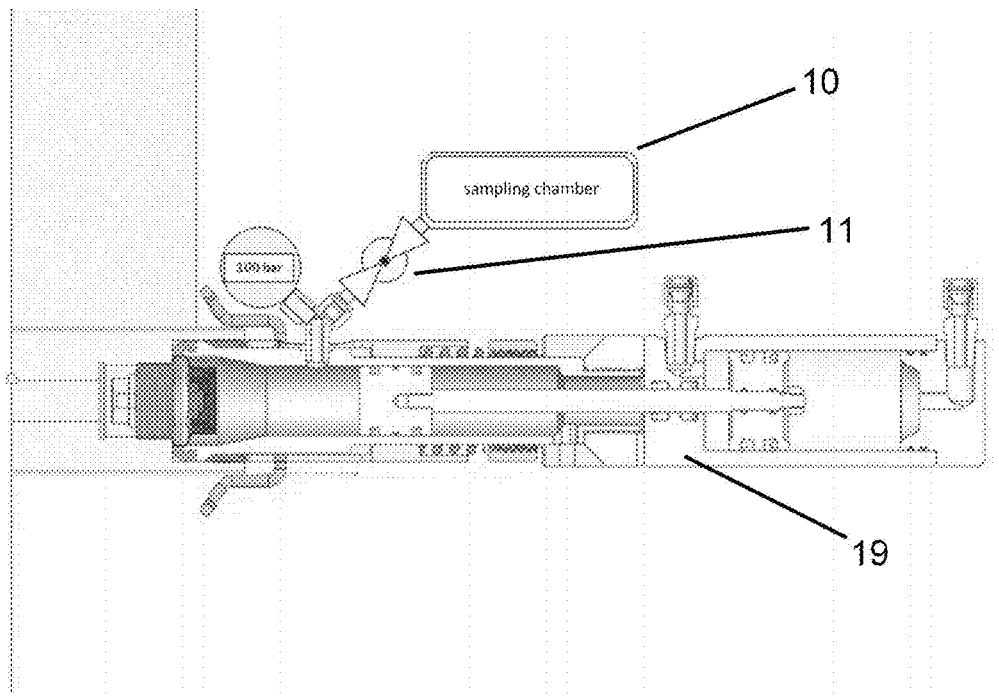
FIG. 3 shows the invention with a coupled sampling chamber.

Additionally and not exclusively, the device can include a chamber (10) for capturing samples of the fluids discharged from the annulus by causing the safety valve (5) to open in order to reduce the external pressure by movement of the plunger (4) of the device. As shown in FIG. 3, connection with the sampling chamber (10) can be provided by the connection that engages the pressure gauge (7) to connect said gauge to the cylinder (3).

Figure 4:
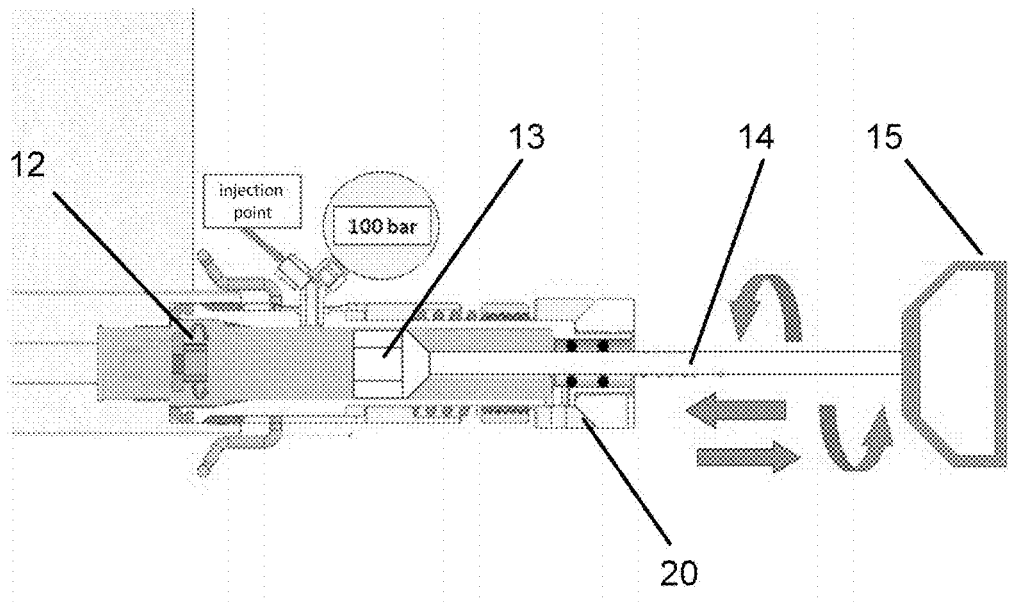
FIG. 4 shows the invention with a handle for removing the safety valve.

In addition to this, the device can contain a hexagonal socket (13) for removing the safety valve (5) or the plug (12) installed in the connector of the flexible line once the device has been sealed against the wall of the recess of the valve (5) or the plug, in order to measure the pressure of the annulus and to inject fluids or chemical products into the annulus. FIG. 4 shows the present invention modified (as an alternative embodiment) so that the hexagonal socket (13) connected to a rod (14) with a coupling and anchoring structure (8) designed to be twisted by the handle (15) and conveyed by the arm of the ROV (2) to remove the safety valve (5). Finally, the control chamber (19) used to control the plunger (4) and cylinder (3) system with the liquid ingress is replaced by the chamber (20) in which operation of the rod (14) and the hexagonal socket (13) is enabled, and which is connected to the cylinder (3).

Figure 5:
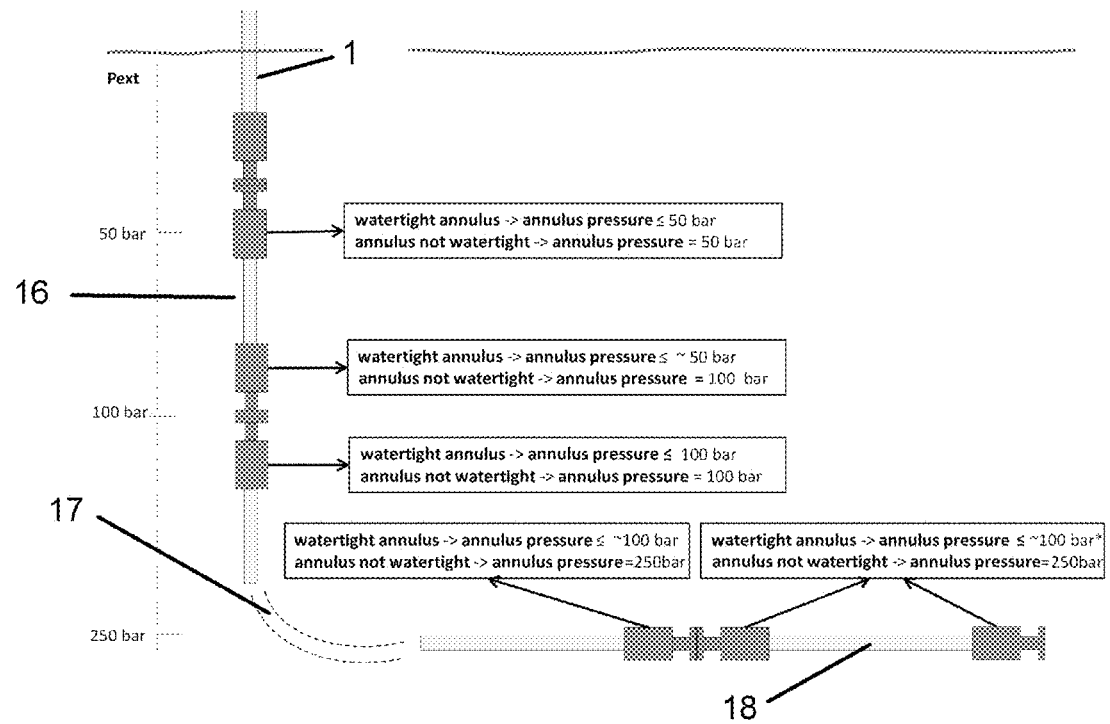
FIG. 5 shows the arrangement of the connectors and of the flexible lines in typical undersea installations.

FIG. 5 shows how the system and method proposed by the present invention can be used in flexible lines and connectors subjected to high hydrostatic pressures (approximately 250 bar) such as in deep-sea applications, without any significant interference in the measurements.

Three practical examples shown in the embodiments in FIG. 5 are provided to help understand how the invention works. This figure shows a typical layout of an undersea flexible line, and the sections and connectors thereof. The connectors have valves designed to reach up to 2 bars above external pressure.

Example 1: FIG. 5 also shows examples in which four connectors are arranged vertically and three connectors are arranged horizontally. The first two connectors are connected physically together and surrounded by 50 bars of static pressure $P_{EST}$, and the second two connectors are also linked physically together and surrounded by 100 bar of static pressure $P_{EST}$. The reference pressure for analyzing watertightness is different for each array of connectors and sections, and this one refers to the intermediate flexible line (16). The connectors connect the bore of the sections by means of the flanged connection (d) and do not connect the annulus of the sections. Consequently, when the external layer of the section is broken, the connectors located at the tips of each section will detect the flooded annulus, and with the flooding each connector will indicate the hydrostatic pressure of 50 bar and 100 bar respectively in the pressure gauge. If the intermediate section (16) is watertight, the pressure in the annulus will be up to 50 bar.

Example 2: The analysis is carried out on the bottom riser, which includes the connectors 17d and 17e located at each tip of this section. A pressure reading of less than 100 bar indicates that the section is watertight. Values between 100 bar and 250 bar indicate flooding.

Example 3: The analysis is carried out on the flexible line, commonly referred to as the flowline, which includes the connectors 18e and 18f located at each tip of this section. A pressure reading of less than 100 bar indicates watertightness, and the pressure reading of 250 bar indicates the total flooding of this section.

Example 4: When the annulus is watertight, there is a column of permeate gas ($CO_2$, $CH_4$, etc.) filling the annulus. The pressure of this gas in the region of the upper connector is at most equal to the hydrostatic pressure at that point as a result of the action of the safety valves and in the lower connector is equal to the pressure value in the region of the upper connector added to the gas column. The low density of the gas makes it possible to approximate the pressure of the lower connector to the pressure of the upper connector.

Example 5: In the case of flowlines where there is little difference in depth (external pressure) between the connectors of the sections, the gas permeation model provided by the manufacturer of the flexible line should be consulted to determine the maximum pressure value to be reached exclusively as a result of the permeate gases. It should be born in mind that the permeation model of the largest manufacturer of flexible lines specifies that the maximum pressure reached in the annulus as a result of permeate gases is approximately 100 bar. Consequently, in flowlines installed at depths greater than 1000 m (100 bar of external pressure), it can be inferred that if the pressure in the annulus is less than the external pressure, then the annulus is watertight.

In general, the inspection analysis methodology for checking whether the annulus is watertight is as follows:
1. The device is positioned in the seat (22) (recess) where the safety valve is installed. At this point, the pressure gauge is reading the hydrostatic pressure.
2. The seals (6) are activated against the wall of the seat (22).
3. The plunger moves forward, pressing the seawater against the front portion thereof in order to check whether the seals are watertight. For this purpose, the pressure in the pressure gauge is read and stabilization is checked to confirm the seal.
4. The plunger is withdrawn to cause a pressure drop, and the behavior of the pressure gauge is checked. If the pressure read in the pressure gauge remains the same as the hydrostatic pressure, it can be inferred that the pressure in the annulus is equal to the hydrostatic pressure and the valve was activated filling the front chamber and maintaining the pressure in the front chamber of the device equal to the hydrostatic pressure.
5. If, once the plunger has been withdrawn, the pressure read in the pressure gauge drops below the hydrostatic pressure, it can be inferred that the valve did not undergo the delta P required for activation (or activation occurred at a pressure below the hydrostatic pressure), i.e. the pressure in the annulus is below the hydrostatic pressure, thereby determining that the annulus is watertight.

If watertightness is confirmed, the method for collecting samples is usually as follows:
1. A stop valve (11) and a cylindrical, vacuumized sampling chamber (10) are connected at the connection point of the pressure gauge (7).
2. Since the annulus is watertight, withdrawing the plunger lowers the pressure to the level at which the safety valve opens, thereby enabling the material in the annulus to enter the chamber of the cylinder (3).
3. The valve (11) is opened.
4. The pressure in the sampling chamber (10) is allowed to reach the pressure enabling samples found in the chamber of the cylinder (3) to be collected.

5. The valve (11) is closed and removed with the sampling chamber (10).

If it is beneficial for a safety valve (5) to be removed from the connector (1), the equipment according to the present invention can be adapted for this purpose. The method continues as follows:
1. The control chamber (19) is withdrawn to reveal the internal mechanisms of the device.
2. The assembly of hexagonal socket (13), rod (14) and handle (15) are mounted on the uncontrolled chamber (20), which is then connected to the cylinder (3).
3. The assembly is moved forward as far as the position of the safety valve (5), the commands being handled via the ROV.
4. The handle (15) is rotated (twisted) to remove the safety valve (5) that is installed in the connector by means of a threaded connection.
5. The safety valve seated in the socket (13) is withdrawn and the ROV (2) pulls the handle (15).
6. The uncontrolled chamber (20) is unscrewed to provide access to the safety valve (5).

Some example problems that could come up when executing the inspection method: the safety valves could get jammed, but are normally forced open by a pressure difference of around 20 bar, some flowlines can require dredging, and finally execution of all of the activities (procedures) needs to be mapped by the ROV pilots.

Innumerable variations affecting the scope of protection are possible. Accordingly, the present invention is not limited to the specific configurations and embodiments described above.

The invention claimed is:

1. A system for detecting water tightness of an annulus in a flexible line from a connector, the system comprising:
- a device containing a plunger and a cylinder, a sealing system, a pressure gauge and a rod, the rod being connected to a chamber for controlled piston-cylinder-type actuation, a face of the cylinder being open and configured to be fitted into a safety valve of the connector of the flexible line;
- a remotely operated underwater vehicle (ROV) including an arm that moves a handle;
- a control chamber; and
- a coupling and anchoring system.

2. The system of claim 1, wherein the sealing system is formed by energizing polymer or metal rings against a wall and a base of a recess, and by opening threads in the wall of the recess or another mechanical device enabling permanent or non-permanent fastening.

3. The system of claim 1, wherein the ROV is connected to a control device.

4. The system of claim 1, wherein the connector of a flexible line includes pressure safety valves (PSV).

5. The system of claim 1, wherein the device contains a sampling chamber and a valve.

6. The system of claim 3, wherein the device contains a hexagonal socket, a rod and a handle, and the chamber of the control device is replaced by the chamber.

7. A method for detecting watertightness in a flexible line from a connector according to the system in claim 1, comprising:
- positioning the device in a seat including a pressure safety valve in the connector,
- activating the seals against a wall of the seat,
- moving the plunger forward using hydraulic action of the ROV, checking operation of the seal by fluctuation of the pressure value in the pressure gauge,
- withdrawing the plunger to cause a pressure drop, resulting in an induced pressure verified by the pressure gauge, if an indicated pressure of the annulus is equal to a hydrostatic pressure at the seat, then the annulus is flooded with seawater, but if the pressure indicated by the pressure gauge is less than the hydrostatic pressure at the seat, then the annulus is watertight.

8. The method of claim 7, wherein the induced pressure is preferably at least 20 bar less than the hydrostatic pressure, or any other value from 2 bar.

9. The method of claim 7, wherein a loss of water tightness is indicated by the pressure in the pressure gauge not dropping when the plunger is withdrawn.

10. The method of claim 7, wherein the device comprises a sampling chamber and a valve, a presence of the sampling chamber, the valve, and the watertightness result enables the following steps to be carried out:
- connecting a valve and a vacuumized sampling chamber to a sensing connection of the pressure gauge;
- withdrawing the plunger, causing the safety valve to open, and thereby filling the cylinder with fluid from the annulus;
- opening the valve;
- filling the sampling chamber with samples, allowing the pressure to equalize with the cylinder; and
- closing the valve and removing the sampling chamber.

11. The method of claim 10, comprising:
- removing the control chamber;
- engaging an uncontrolled chamber;
- moving an assembly comprising a hexagonal socket, the rod and the handle to the position of the valve using commands given to the ROV;
- rotating the handle to remove the valve that is screwed on;
- withdrawing the socket with the connected valve to remove said valve from the seat; and
- where applicable, removing the uncontrolled chamber to swap the valve.

* * * * *